US012568480B2

(12) United States Patent
    Paycher

(10) Patent No.: US 12,568,480 B2
(45) Date of Patent: Mar. 3, 2026

(54) TECHNIQUES FOR ACTIVITY BASED WIRELESS DEVICE COEXISTENCE

(71) Applicant: Apple Inc., Cupertino, CA (US)

(72) Inventor: Alon Paycher, Beit Hananya (IL)

(73) Assignee: Apple Inc., Cupertino, CA (US)

( * ) Notice: Subject to any disclaimer, the term of this patent is extended or adjusted under 35 U.S.C. 154(b) by 710 days.

(21) Appl. No.: 17/483,369

(22) Filed: Sep. 23, 2021

(65) Prior Publication Data

US 2023/0087807 A1      Mar. 23, 2023

(51) Int. Cl.
    *H04W 72/12*      (2023.01)
    *H04W 24/02*      (2009.01)
    *H04W 84/12*      (2009.01)
    *H04W 88/06*      (2009.01)

(52) U.S. Cl.
    CPC ....... *H04W 72/1215* (2013.01); *H04W 24/02* (2013.01); *H04W 84/12* (2013.01); *H04W 88/06* (2013.01)

(58) Field of Classification Search
    CPC . H04W 72/1215; H04W 24/02; H04W 84/12; H04W 72/0453; H04W 88/06
    See application file for complete search history.

(56) References Cited

U.S. PATENT DOCUMENTS

| | | | | |
|---|---|---|---|---|
| 10,560,215 B1 * | 2/2020 | Hegar | ............... | H04N 1/00007 |
| 11,570,283 B1 * | 1/2023 | Ghule | ............... | H04L 63/1483 |
| 2008/0318630 A1 * | 12/2008 | Gil | ............... | H04W 72/1215 |
| | | | | 455/561 |
| 2014/0094210 A1 * | 4/2014 | Gellens | ............... | H04W 4/12 |
| | | | | 455/517 |
| 2014/0274105 A1 | 9/2014 | Wang | | |
| 2016/0065640 A1 * | 3/2016 | Luby | ............... | H04N 21/23406 |
| | | | | 709/219 |

(Continued)

FOREIGN PATENT DOCUMENTS

| | | |
|---|---|---|
| CN | 102835173 A | 12/2012 |
| CN | 112566130 A | 3/2021 |
| JP | 2004248068 A * | 9/2004 |

OTHER PUBLICATIONS

Kuroda et al., "Voice Communication System, Voice Communicating Method, Communication Terminal, Router and Peripheral Router", Sep. 2, 2004, JP, English language translation of JP 2004248068 (Year: 2004).*

(Continued)

*Primary Examiner* — Michael K Phillips
(74) *Attorney, Agent, or Firm* — Kilpatrick Townsend & Stockton LLP

(57) ABSTRACT

Embodiments of the present disclosure provide systems, methods, and computer-readable medium for managing coexistence between two wireless communication devices. A method may include obtaining, by a communication device, protocol metadata corresponding to one or more communication protocols individually associated with respective activity identifiers. A request comprising an activity identifier may be received via a communication channel (e.g., a system power management interface). The protocol metadata corresponding to the activity identifier may be utilized to identify at least one of an action or a threshold which may then be performed and/or applied.

20 Claims, 8 Drawing Sheets

700

(56) References Cited

U.S. PATENT DOCUMENTS

| | | | |
|---|---|---|---|
| 2016/0381645 A1* | 12/2016 | Shanks | H04W 52/386 |
| | | | 370/338 |
| 2017/0155736 A1* | 6/2017 | Schukovets | H04L 67/01 |
| 2018/0176265 A1* | 6/2018 | Le Rouzic | H04L 65/80 |
| 2019/0158899 A1* | 5/2019 | Sakai | H04N 21/437 |
| 2019/0205115 A1* | 7/2019 | Gomes | H04W 4/44 |
| 2019/0334764 A1* | 10/2019 | Chor | G06F 11/0793 |
| 2021/0409335 A1* | 12/2021 | Zhu | H04L 47/24 |
| 2023/0154418 A1* | 5/2023 | Kunkel | G09G 3/2092 |
| | | | 345/212 |
| 2024/0223679 A1* | 7/2024 | VanAntwerp | G06Q 10/067 |

OTHER PUBLICATIONS

Fielding et al., "Request for Comments: 7231", Jun. 2014, IETF (Year: 2014).*

Ashraf et al., "A Heterogeneous Service-Originated Deep Packet Inspection and Analysis Framework for Traffic-Aware Network Management and Security Systems", Sep. 14, 2016, IEEE Access (Year: 2016).*

Chinese Patent Application No. CN202210592385.X, Office Action, Mailed On Jun. 24, 2025, 17 pages (9 pages of English translation and 8 pages of official language copy).

* cited by examiner

100

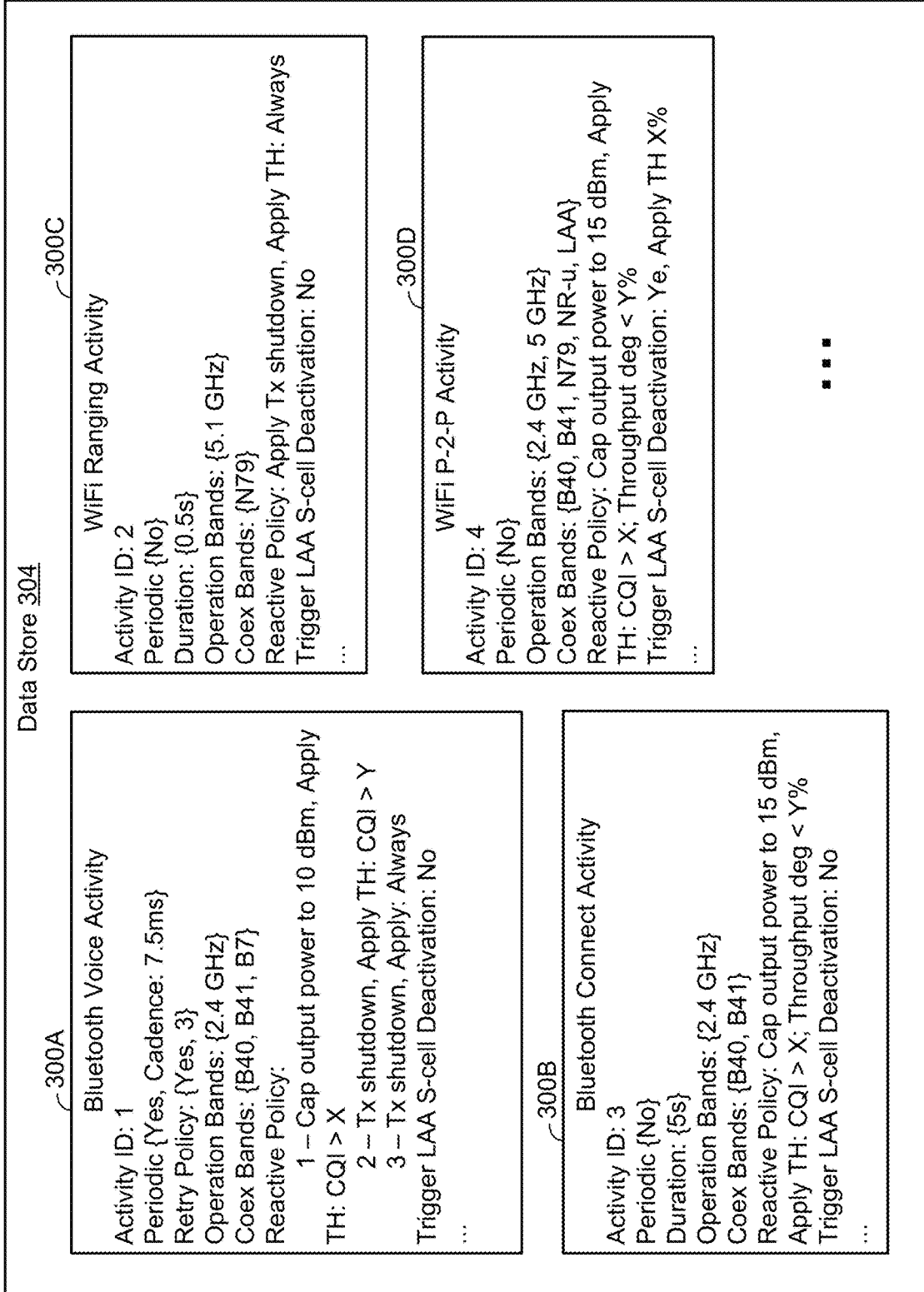

Data Store 304

300A

Bluetooth Voice Activity

Activity ID: 1
Periodic {Yes, Cadence: 7.5ms}
Retry Policy: {Yes, 3}
Operation Bands: {2.4 GHz}
Coex Bands: {B40, B41, B7}
Reactive Policy:
   1 – Cap output power to 10 dBm, Apply
TH: CQI > X
   2 – Tx shutdown, Apply TH: CQI > Y
   3 – Tx shutdown, Apply: Always
Trigger LAA S-cell Deactivation: No
...

300B

Bluetooth Connect Activity

Activity ID: 3
Periodic {No}
Duration: {5s}
Operation Bands: {2.4 GHz}
Coex Bands: {B40, B41}
Reactive Policy: Cap output power to 15 dBm,
Apply TH: CQI > X; Throughput deg < Y%
Trigger LAA S-cell Deactivation: No
...

300C

WiFi Ranging Activity

Activity ID: 2
Periodic {No}
Duration: {0.5s}
Operation Bands: {5.1 GHz}
Coex Bands: {N79}
Reactive Policy: Apply Tx shutdown, Apply TH: Always
Trigger LAA S-cell Deactivation: No
...

300D

WiFi P-2-P Activity

Activity ID: 4
Periodic {No}
Operation Bands: {2.4 GHz, 5 GHz}
Coex Bands: {B40, B41, N79, NR-u, LAA}
Reactive Policy: Cap output power to 15 dBm, Apply
TH: CQI > X; Throughput deg < Y%
Trigger LAA S-cell Deactivation: Ye, Apply TH X%
...

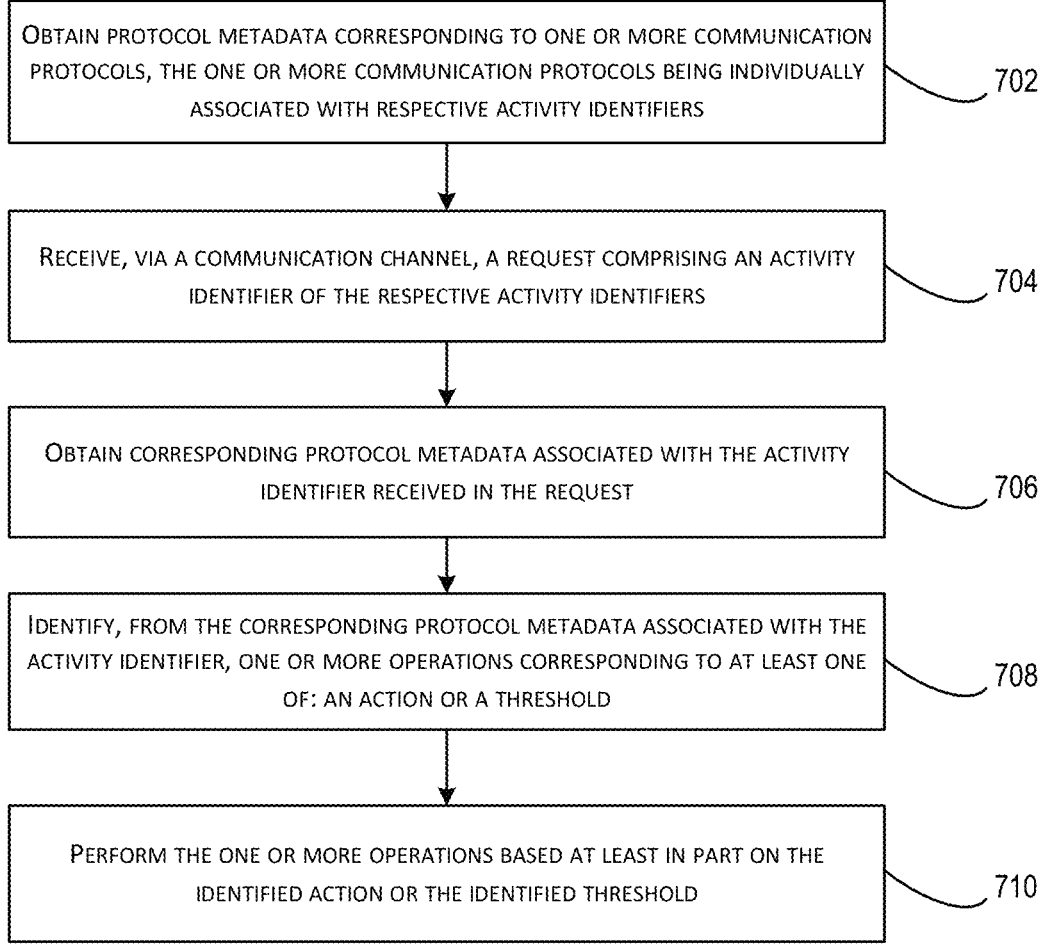

OBTAIN PROTOCOL METADATA CORRESPONDING TO ONE OR MORE COMMUNICATION PROTOCOLS, THE ONE OR MORE COMMUNICATION PROTOCOLS BEING INDIVIDUALLY ASSOCIATED WITH RESPECTIVE ACTIVITY IDENTIFIERS    702

RECEIVE, VIA A COMMUNICATION CHANNEL, A REQUEST COMPRISING AN ACTIVITY IDENTIFIER OF THE RESPECTIVE ACTIVITY IDENTIFIERS    704

OBTAIN CORRESPONDING PROTOCOL METADATA ASSOCIATED WITH THE ACTIVITY IDENTIFIER RECEIVED IN THE REQUEST    706

IDENTIFY, FROM THE CORRESPONDING PROTOCOL METADATA ASSOCIATED WITH THE ACTIVITY IDENTIFIER, ONE OR MORE OPERATIONS CORRESPONDING TO AT LEAST ONE OF: AN ACTION OR A THRESHOLD    708

PERFORM THE ONE OR MORE OPERATIONS BASED AT LEAST IN PART ON THE IDENTIFIED ACTION OR THE IDENTIFIED THRESHOLD    710

TECHNIQUES FOR ACTIVITY BASED WIRELESS DEVICE COEXISTENCE

BACKGROUND

Today's wireless devices use a multitude of radio frequency (RF) wireless technologies (e.g., Bluetooth® (BT), Wireless Fidelity (WiFi), ultra-wideband (UWB), cellular, etc.) on a single platform (e.g., a smartphone). Many of the corresponding wireless communications standards operate within the same frequency spectrum. These wireless devices may be required to work effectively together while sharing a common frequency band and/or due to harmonics. When multiple wireless standards occupy the same frequency band, it is possible for one standard to interfere with another wireless standard. Conventionally, wireless coexistence techniques included static and globally applied thresholds that failed to take into account the individual aspects of a given wireless technology. This provides a suboptimal implementation as the features and usage of these wireless devices vary.

SUMMARY

Embodiments of the present disclosure can provide systems, methods, and computer-readable medium for implementing techniques for managing wireless device coexistence based at least in part on the particular activity being performed.

In some embodiments, a computer-implemented method is disclosed. The method may comprise obtaining, by a communication device, protocol metadata corresponding to one or more communication protocols. In some embodiments, the one or more communication protocols are individually associated with respective activity identifiers. The method may further comprise receiving, via a communication channel (e.g., a system power management interface, a bus, an interface, etc.), a request comprising an activity identifier of the respective activity identifiers. The method may further comprise obtaining, by the communication device, corresponding protocol metadata associated with the activity identifier received in the request. The method may further comprise identifying, from the corresponding protocol metadata associated with the activity identifier, one or more operations corresponding to at least one of: an action or a threshold. The method may further comprise performing, by the communication device, the one or more operations based at least in part on the identified action or the identified threshold.

In some embodiments, the system power management interface comprises a high-speed, bi-directional serial bus. The method may further comprise receiving, via the system power management interface, an additional request comprising a second activity identifier. In some embodiments, the activity identifier may be a first activity identifier, and the first activity identifier may be different from the second activity identifier. The method may further comprise obtaining, by the communication device, additional protocol metadata corresponding to the second activity identifier received in the additional request. The method may further comprise determining, from a priority mapping, a first priority associated with a first activity corresponding to the first activity identifier and a second priority associated with a second activity corresponding to the second activity identifier. In some embodiments, identifying the one or more operations is based at least in part on the protocol metadata, the additional protocol metadata, the first priority, and the second priority.

In some embodiments, the protocol metadata comprises at least one of: a periodicity value, a retry policy, one or more operation bands, one or more coexistence bands, or one or more reactive policies. A reactive policy of the one or more reactive policies may define one or more respective operations to perform in response to receiving a corresponding request that includes a specific activity identifier that corresponds to the protocol metadata.

In some embodiments, the communication device is a communication chip configured to transmit and receive data in accordance with a particular set of communication protocols. The request may be received from a separate communication device. In some embodiments, the communication device and the separate communication device are a part of a user device.

In some embodiments, a communication device is disclosed. The communication device may comprise one or more processors and a memory storing non-transitory, computer-executable instructions that, when executed by the one or more processors, cause the communication device to perform operations. The operations may include obtaining, by a communication device, protocol metadata corresponding to one or more communication protocols. In some embodiments, the one or more communication protocols are individually associated with respective activity identifiers. The operations may further include receiving, via a system power management interface, a request comprising an activity identifier of the respective activity identifiers. The operations may further include obtaining, by the communication device, corresponding protocol metadata associated with the activity identifier received in the request. The operations may further include identifying, from the corresponding protocol metadata associated with the activity identifier, one or more operations corresponding to at least one of: an action or a threshold. The operations may further include performing, by the communication device, the one or more operations based at least in part on the identified action or the identified threshold.

In some embodiments, the protocol metadata corresponding to the one or more communication protocols corresponds to one or more communication devices separate from the communication device. The communication device may be one of a plurality of communication devices located at a user device.

In some embodiments, executing the computer-executable instructions further causes the communication device to identify, from the protocol metadata corresponding to the activity identifier, one or more subsequent operations corresponding to at least one of: an additional action or an additional threshold. In some embodiments the communication device may set a timer associated with the one or more subsequent operations and perform the one or more subsequent operations based at least in part on expiration of the timer.

In some embodiments, the protocol metadata identifies the action corresponding to the activity identifier, and the action comprises adjusting a power setting of the communication device. In some embodiments, the protocol metadata identifies the action corresponding to the activity identifier, and the action comprises triggering deactivation of a secondary cell configured to utilize an unlicensed spectrum for transmission.

In some embodiments, a computer-readable storage medium is disclosed. The computer-readable storage medium may have stored thereon computer-executable instructions that, when executed by at least one processor, cause the at least one processor to perform operations. The operations may comprise obtaining protocol metadata corresponding to a plurality of communication protocols, the plurality of communication protocols being individually associated with respective activity identifiers. The operations may further comprise receiving, via a system power management interface, a request comprising an activity identifier of the respective activity identifiers. The operations may further comprise obtaining corresponding protocol metadata associated with the activity identifier received in the request. The operations may further comprise identifying, from the corresponding protocol metadata associated with the activity identifier, one or more operations corresponding to at least one of: an action or a threshold. The operations may further comprise performing the one or more operations based at least in part on the identified action or the identified threshold.

In some embodiments, the protocol metadata identifies a threshold value, and the threshold value specifies an acceptable degree of throughput degradation. In some embodiments, the protocol metadata identifies a plurality of actions and each action of the plurality of actions corresponds to either a first transmission attempt or a subsequent transmission attempt.

In some embodiments, the computing device is one component of a user device, and executing the computer-executable instructions further causes the computing device to receive the protocol metadata from a second component of the user device. In some embodiments, the computing device is a first computing device in communication with a second computing device and the first computing device stores the protocol metadata. In some embodiments, the protocol metadata corresponds to the second computing device.

In some embodiments, the second computing device stores additional protocol metadata corresponding to the first computing device and the first computing device and the second computing device operate within a same frequency spectrum.

The following detailed description together with the accompanying drawings will provide a better understanding of the nature and advantages of the present disclosure.

BRIEF DESCRIPTION OF THE DRAWINGS

FIG. 3 illustrates an exemplary set of protocol metadata instances, in accordance with at least one embodiment.

FIG. 5 illustrates an example use case for managing coexistence between two or more wireless technologies, in accordance with at least one embodiment.

FIG. 6 illustrates another example use case for managing coexistence between two or more wireless technologies, in accordance with at least one embodiment.

FIG. 7 is a flow diagram to illustrate an example method for managing coexistence between two or more wireless technologies, in accordance with at least one embodiment.

DETAILED DESCRIPTION

Figure 1:
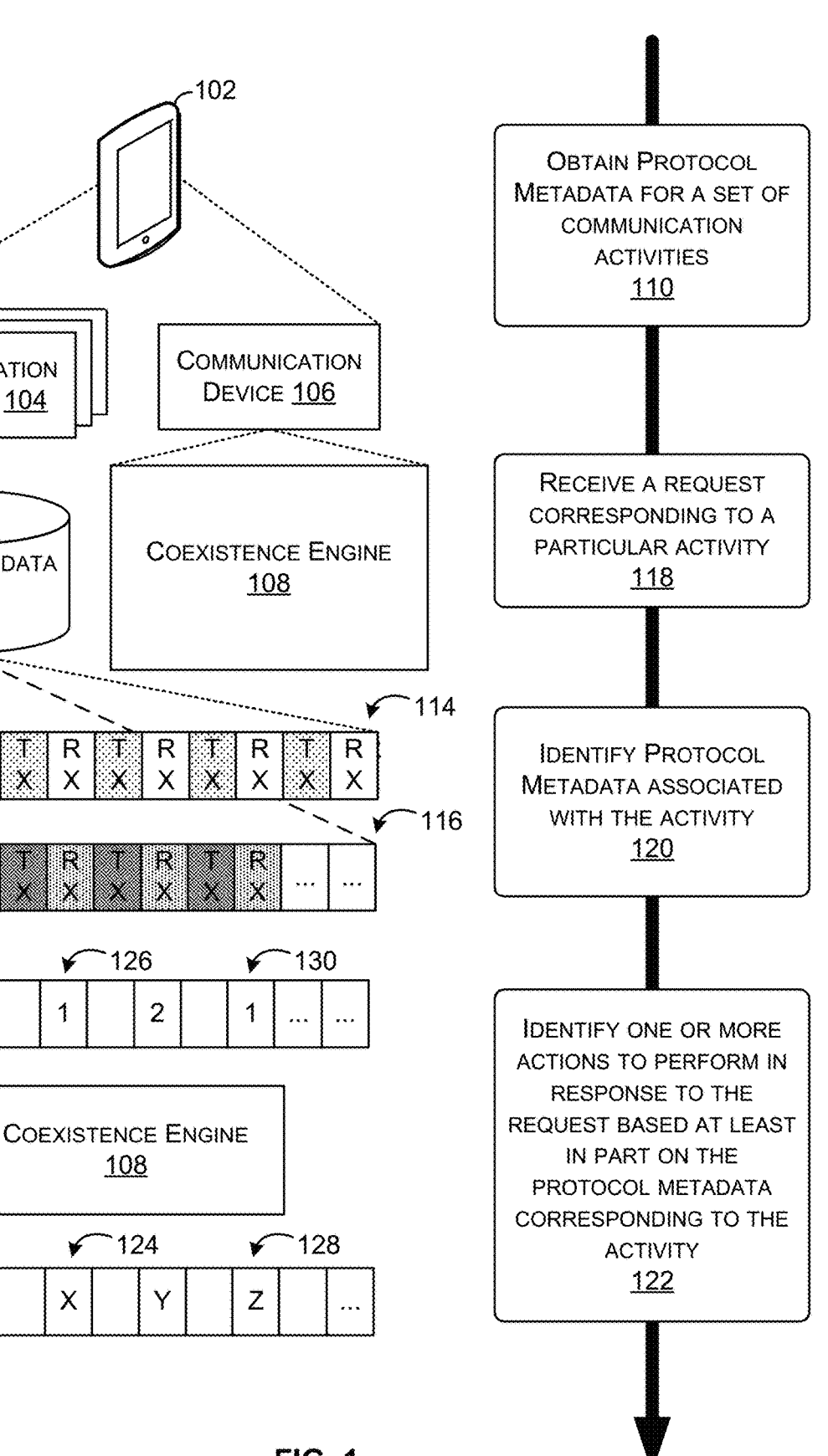
FIG. 1 is a simplified block diagram illustrating an example flow for managing coexistence between two or more wireless technologies using a coexistence engine, in accordance with at least one embodiment.

Certain embodiments of the present disclosure relate to implementing various techniques for providing activity-based wireless device coexistence. Today, user devices (e.g., smartphones, tablets, laptops, and the like) often include a variety of wireless technologies such as Bluetooth® (BT), WiFi, ultra-wideband (UWB), cellular, and the like. When multiple wireless transmitters (e.g., chips that share common frequency bands) are in close proximity, the possibility of interference and coexistence problems increases.

Conventionally, wireless coexistence techniques include static and globally applied thresholds that fail to take into account the individual aspects of a given wireless technology. For example, a wireless device (e.g., a BT radio) might make a request to another wireless device (e.g., a cellular radio) to stop transmitting so that it may perform some operation without interference. The request may be honored by the receiving device (e.g., the cellular radio), so long as honoring the request does not cause performance of the complying device to drop below a particular threshold. Current coexistence techniques do not distinguish between the underlying activities associated with one request or another. Nor do the particular operations to be performed by the requesting device factor in to whether the request is honored. This is problematic because providing an optimal user experience may require prioritizing certain activities above others, and some wireless protocols might be more sensitive than others, such that missing a transmission or reception opportunity creates a more noticeable impact to the user than others.

The techniques discussed herein utilize an activity identifier for requests between wireless devices. Each wireless device may be configured to store protocol metadata (e.g., data that identifies various features of the communication protocol used to transmit data for various activities such as any suitable combination of a periodicity value, a retry policy, one or more operation bands, one or more coexistence bands, one or more reactive policies, and the like) for other nearby wireless devices. When a request is issued, the transmitting device may include, in the request, an activity identifier that indicates the particular activity to be performed. Using this information, the receiving device can differentiate between activities, such that a more optimal user experience may be achieved. The receiving device may identify, from stored protocol metadata, one or more features of the communications protocol to be utilized by the requesting device for a given activity. By utilizing this metadata, the receiving device can execute more informed decisions as to whether to comply with the request and/or how best to manage multiple requests from multiple wireless devices.

By way of example, a user device including a cellular device (e.g., cellular device 202D) and a WiFi device (e.g., WiFi device 202B of FIG. 2) may be utilized. WiFi ranging allows a user to unlock a personal computer while he wears an accessory device (e.g., a smartwatch) when the accessory device is brought within some threshold distance of the personal computer. The WiFi ranging operations are a high priority activity that lasts 0.5 seconds. The activity may run on a frequency band that is also used by the cellular device for new radio unlicensed operations.

In legacy systems, the WiFi device sends a real-time request to a cellular device asking the cellular device to turn off its transmission. The cellular device does not know what activity the WiFi device is performing so it honors the request as long as throughput is not degraded by more than 20% (which is the same threshold it applies to all WiFi requests). As a result, the unlock operation is interfered and the personal computer remains locked.

Using the techniques disclosed herein, the WiFi sends the real-time request with an activity ID that identifies the activity as a WiFi Unlock Activity. The cellular device (running the coexistence engine discussed herein) identifies the activity based on the activity ID and, utilizing corresponding protocol metadata as discussed herein, identifies that the unlock activity lasts only 0.5 seconds. In some embodiments, the cellular device may identify from the protocol metadata (e.g., predefined data) a different threshold to utilize. For example, the cellular coexistence engine may allow more than a 20% degradation of cellular quality based on identifying the request as pertaining to a WiFi unlock. This is preferred because the WiFi activity is important and temporary and interference with this activity would negatively impact the user. Accordingly, the coexistence engine allows a temporary (0.5 seconds) throughput degradation of the cellular device that may pass unnoticed by the user in order to prioritize the WiFi unlock activity. In some embodiments, the coexistence engine may be configured to utilize previously stored priority data that identifies a priority between various activities where the activities may pertain to one or more communication devices (e.g., the communication devices 202). Using this priority data, the coexistence engine may prioritize various activities of the cellular device and activities of other communication devices according to a predefined priority scheme (e.g., a predefined set of rules defining priority between activities).

In previous systems, a BT radio might make a request to a cellular radio to stop transmitting for some relatively brief time period. The BT radio request may be for a BT voice activity that includes multiple transmission retry attempts. In previous systems, the cellular radio would not differentiate between the multiple transmission attempts. Rather, each request would be treated exactly the same (e.g., the cellular radio would honor the request each time, so long as honoring the request would not degrade cellular performance by some predefined threshold). However, voice activities may play a large role in providing an enjoyable user experience. Failing to transmit such data could result in the user hearing clicks, which can be exceedingly annoying to the user and result in a poor user experience. Using the techniques discussed herein, the cellular radio can utilize the protocol metadata to determine that multiple attempts may be made by the BT radio to transmit the voice activity data. Utilizing this information, the cellular radio may provide increasing priority to each subsequent retry to ensure that the voice activity is transmitted at the expense of an activity that would create less of an impact to the user.

Thus, the techniques disclosed herein enable the wireless technologies of a device to be more well informed with respect to the activities to be conducted by other wireless technologies of the device. This causes more intelligent decisions to be made that result in an overall improved user experience.

Moving on to FIG. 1, where an example flow 100 is illustrated for managing coexistence between two or more wireless technologies using a coexistence engine, in accordance with at least one embodiment. A user device 102 (e.g., a smartphone, a laptop, a tablet PC, etc.) may include any suitable number of communication devices (e.g., communication device(s) 104, communication device 106, etc.). A communication device may be a separate integrated circuit (e.g., a microchip, also referred to as a "chip" or a "communication chip") that integrates hardware and software on top of a chipset to provide various communications corresponding to a particular wireless technology. Each of the communication devices discussed herein may include any suitable combination of an onboard microprocessor, memory, a power supply connector, an antenna port, and/or any suitable component configured to aid in performance of wireless communications corresponding to the particular wireless technology. Each communication device may utilize a communication protocol for wireless communications. A "communication protocol" refers to a predefined set of rules that specify the manner in which electronic devices communicate with one another wirelessly. For example, a communication protocol may specify message structures, message transmit and/or receipt rules, retry requests, or the like.

The flow 100 may be performed by any of the communication devices depicted in FIG. 1 (e.g., by the coexistence engine 108, a corresponding instance of which may execute on each of the communication device(s) 104 and communication device 106). Each of the communication devices may reside at the user device 102 and be communicatively connected with one another via a serial bus (not depicted). Each communication device performs various activities (corresponding to a set of predefined series of one or more transmissions and/or receptions) such as, but not limited to, setting up a BT connection, conducting a voice call, executing a low latency audio connection, conducting a voice call with low latency audio connections, screen mirroring, streaming content, automatically unlocking one user device using the proximity of another, or the like. At least some of the communication device(s) operating at the user device 102 perform one or more activities utilizing a common frequency band. Utilizing the common frequency band increases the possibility of interference and coexistence problems between those communication devices. By way of example, a user could conduct a video call with a Bluetooth headset on 2.4 GHz. In this example, Bluetooth receptions may be impacted by cellular (e.g., LTE transmissions), although cellular receptions may not be impacted by BT transmissions.

The flow 100 may begin at 110, where protocol metadata for a set of communication activities (e.g., a cellular chip, a Bluetooth (BT) chip, etc.) may be obtained. In some embodiments, an instance of protocol metadata may identify various aspects of one or more communications to be made corresponding to a particular activity (e.g., as identified by an activity identifier). By way of example, an instance of protocol metadata corresponding to a BT voice activity may indicate that a particular number of messages (e.g., three messages) may be transmitted at a particular frequency/cadence (e.g., 7.5 milliseconds (ms) apart). In some embodiments, the protocol metadata for the BT voice activity may further identify that a particular number of retries may occur. A retry may occur, for example, if the transmitting device fails to receive a response indicating the transmitted message was received by the intended recipient. In some embodiments, the protocol metadata may indicate one or more operations to be performed in response to receiving a request that includes an activity identifier associated with the protocol metadata. In general, protocol metadata may include any suitable data such as a transmission periodicity, cadence, pattern, retry policy, operation band(s) utilized for transmission, one or more coexistence band(s), one or more policies for responding to a request with a corresponding activity identifier, or any suitable information related to any aspect, attribute, or feature of the transmissions corresponding to a given activity or the operations to be performed as a result of receiving a request corresponding to the activity. The coexistence engine 108 may store protocol metadata at the protocol data store 112, a data store configured to store such information.

As a non-limiting example, protocol data store 112 may store data for activity 1 and activity 2. The protocol metadata for activity 1 may indicate that a message may be transmitted every 9 ms for five seconds (or until a response is received) as illustrated at 114. The protocol metadata corresponding to activity 2 may indicate that a message is to be transmitted three times, 7.5 ms apart, as depicted at 116.

At 118, a request may be received (e.g., from one of the communication device(s) 104) that corresponds to a particular activity. In some embodiments, the request may include an activity identifier that uniquely identifies the particular activity. By way of example, the request may indicate the activity is a Bluetooth connect activity (e.g., corresponding to one or more messages that are transmitted and/or received during connection of a BT device).

At 120, the coexistence engine 108 may identify protocol metadata associated with the activity. By way of example, the coexistence engine 108 may utilize the activity identifier received in the request to retrieve a corresponding instance of protocol metadata (e.g., protocol metadata that is associated with the same activity identifier).

At 122, the coexistence engine 108 may identify, based at least in part on a predefined rule set, one or more actions to perform in response to the request based at least in part on the protocol metadata corresponding to the activity. For example, the coexistence engine 108 may identify, from the protocol metadata associated with activity identifier provided in a given request, that a set of operations (e.g., action(s) X as depicted at 124) are to be performed in response to the first time a request is received with a particular activity identifier (as depicted at 126). The same operations described above can be executed for a subsequently received request with the same activity identifier (e.g., when a retransmission is is to be attempted). The coexistence engine 108 may identify another set of operations (e.g., action(s) X as depicted at 128) to be executed in response to receiving another request corresponding to that activity identifier (as depicted at 130).

Not every operation performed by the coexistence engine 108 need be triggered by receipt of a request. In some embodiments, the coexistence engine 108, using the protocol metadata, may anticipate that a request will soon be received (e.g., due to a particular periodicity indicated in the protocol metadata) and may perform any suitable operations in advance of receiving a subsequent request.

By way of example, if a cellular chip's transmission packet is anticipated to overlap with a BT activity, for which the start time is known, the cellular transmission output power may be limited/capped in advance. As another example, when a BT activity is on-going, link quality measurements may be scheduled for times that do not conflict with the on-going BT activity since taking such measurements will be disturbed by BT transmissions. As yet another example, if a cellular packet is anticipated to overlap with a BT activity, an antenna that has better isolation may be selected for transmission due to the antenna having less interferences. Conventionally, the anticipatory actions described above are not possible since the cellular chip (or any chips of the user's device) does not have access to any protocol information with which an upcoming packet could be anticipated. Instead, the cellular chip applies the same limitations at all times. By utilizing the techniques described herein, anticipation is possible such that the chips need not apply the limitations at all times or the same limitations for all activities.

Figure 2:
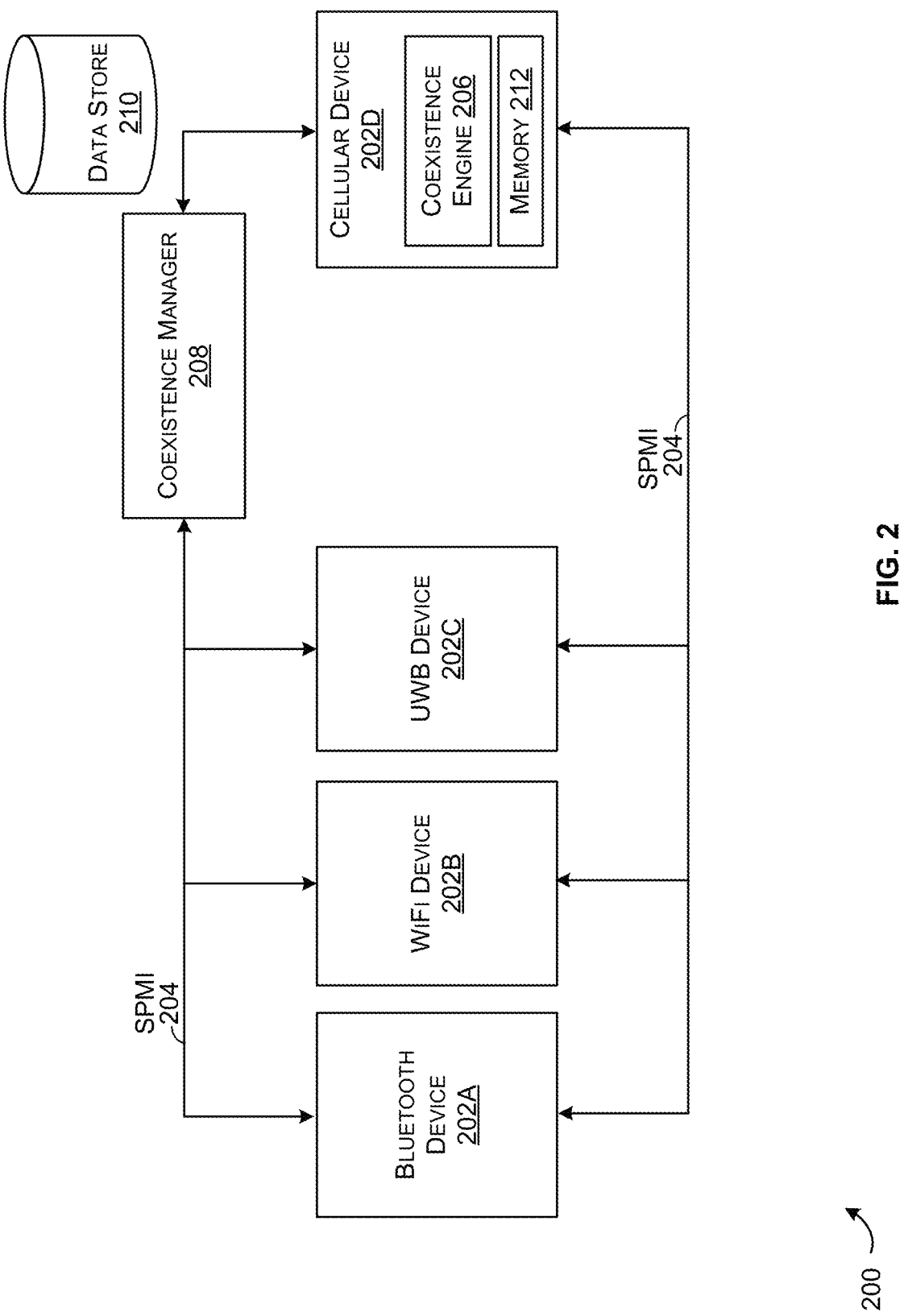
FIG. 2 is an example computing environment including a number of communication devices, in accordance with at least one embodiment.

FIG. 2 is an example computing environment 200 including a number of communication devices, in accordance with at least one embodiment. The particular number and/or type of communication devices may vary. For example, as depicted in FIG. 2, the communication devices may include Bluetooth (BT) device 202A, wireless fidelity (WiFi) device 202B, ultra-wideband (UWB) device 202C, and cellular device 202D, collectively referred to herein as "communication devices 202." Although a particular number and type of communication devices are illustrated in FIG. 2, the example of FIG. 2 is not intended to limit the scope of this disclosure. Communication devices 202 may include any suitable number and/or type of communication devices (e.g., any suitable combination of the communication devices depicted in FIG. 2 and/or other communication devices not depicted in FIG. 2). In some embodiments, the communication devices 202 may be located adjacent to one another on a common device (e.g., the user device 102).

Each of the communication devices 202 may be a separate integrated circuit (e.g., a microchip, also referred to as a "chip" or a "communication chip") that integrates hardware and software on top of a chipset to provide various communications corresponding to a particular wireless technology. Each of the communication devices 202 may include an onboard microprocessor, memory, a power supply connector, an antenna port, and/or any suitable component configured to aid in performance of wireless communications corresponding to the particular wireless technology.

In some embodiments, the environment 200 may include a communication channel (e.g., System Power Management Interface (SPMI) 204). SPMI 204 may include a serial bus (e.g., a high-speed, low-latency, bi-directional, two-wire serial bus, or the like) that may be used for power management activities and/or for enabling communication between the communication devices 202. In some embodiments, SPMI 204 may be utilized for communicating data between communication devices 202 (e.g., integrated circuits corresponding to different wireless communication technologies). SPMI 204 is used herein for illustrative purposes and is not intended to limit the scope of this disclosure. Any suitable proprietary bus or interface may be similarly utilized for communication between communication devices 202. In some embodiments, on-chip communication may be utilized for communication between communication devices 202 (e.g., in cases in which all the communication devices 202 are integrated on a common chip). In these circumstances, the communications between communication devices 202 will be shared memory base with no bus needed.

In some embodiments, the coexistence engine 206 may execute at the cellular device 202D to manage operations at the cellular device 202D. The coexistence engine 206 may be an example of the coexistence engine 108 of FIG. 1. It should be understood that any suitable number of the communication devices 202 may execute a respective instance of the coexistence engine 206. In some embodiments, a single instance of the coexistence engine 206 may reside at any suitable communication device and be utilized to manage coexistence for any suitable combination of the communication devices 202.

In some embodiments, the environment 200 may include coexistence manager 208. Coexistence manager 208 may be configured to obtain, store, and/or maintain any suitable number of instances of protocol metadata corresponding to any suitable number of activity identifiers and/or communication devices. By way of example, the coexistence manager 208 (e.g., a component of an operating system of the user device 102 of FIG. 1) may be configured to obtain from data store 210 any suitable number of protocol metadata instances corresponding to any suitable number of activities associated with the communication devices 202. In some embodiments, the data store 210 may be situated at a server device or in local memory of the device on which communication devices 202 execute (e.g., user device 102, etc.). In some embodiments, the coexistence manager 208 may be configured to provide each coexistence engine 206 instances of protocol metadata that describes various aspects of the activities associated with other communication devices.

By way of example, the coexistence manager 208 may be configured to retrieve any suitable number of protocol metadata instances (e.g., from data store 210, in this example, residing at user device 102) that correspond to various activities that are performable by the communication devices 202A, 202B, and 202C. The cellular device 202D may include one or more memories (e.g., memory 212) in which the provided protocol metadata instances may be stored. In some embodiments, these operations enable each of the communication devices 202 to have access to data that identifies the various features of the actions that might be performed by the other communication devices of environment 200.

In some embodiments, data store 210 may include priority data (e.g., one or more mappings) that indicate a priority assigned to one or more activity identifiers. By way of example, the priority data may indicate that one activity identifier (e.g., activity identifier 4) is of a higher priority than another activity identifier (e.g., activity identifier 3). In general, the priority data may specify any suitable data with which a priority for transmitting a message in a given situation may be identified. If a coexistence engine receives multiple requests from one or more communication devices, the coexistence engine may identify which activity (or activities) are to be prioritized over others. The coexistence manager 208 may be configured to similarly distribute such data between the communication devices such that each communication device may store the priority data locally and utilize such data to identify priorities of potentially conflicting activities.

FIG. 3 illustrates an exemplary set of protocol metadata instances (e.g., protocol metadata instances 300A-300D, collectively referred to as "protocol metadata instances 300"), in accordance with at least one embodiment. In some embodiments, protocol metadata instance 300A and 300B may correspond to activities that are associated with the BT device 202A of FIG. 2. Protocol metadata instances 300C and 300D may correspond to activities associated with the WiFi device 202B of FIG. 2. Protocol metadata instances 300 may include any suitable number of data instances that are individually associated with any suitable combination of the communication devices 202 of FIG. 2. In some embodiments, the protocol metadata instances 300 may be stored in data store 304 (e.g., an example of the data stores 210 and/or a data store within memory 212 of FIG. 2).

In some embodiments, each of the protocol metadata instances 300 may include any suitable data that identifies an aspect or feature of the activity corresponding to that instance. By way of example, protocol metadata instance 300A may correspond to a Bluetooth voice activity that is associated with a unique identifier (e.g., activity ID: 1). In some embodiments, the identifier associated with each protocol metadata instance may be an alphanumeric identifier of any suitable length that is configured to uniquely distinguish a particular protocol metadata instance from other protocol metadata instances.

As depicted in FIG. 3, protocol metadata instance 300A may include one or more periodicity values. A periodicity value indicates one or more attributes of a periodicity of message transmission associated with the given activity. By way of example, protocol metadata instance 300A may include a set of periodicity values (e.g., {yes, cadence: 7.5 ms}) that indicate one or more aspects of the message transmission periodicity corresponding to a Bluetooth voice activity. For example, the set of periodicity values may indicate that there is a periodicity associated with message transmission corresponding to a Bluetooth voice activity (e.g., "Yes") and that the periodicity at which messages are transmitted corresponds to 7.5 ms between messages (e.g., "cadence: 7.5 ms"). The protocol metadata instance 300A may include any suitable data that identifies whether a retry will be attempted if no response is received by the transmitting communication device and/or a number of retries the transmitting device may attempt. In some embodiments, the protocol metadata instance 300A may indicate one or more operation bands (e.g., 2.4 gigahertz (GHz)). A frequency band is an interval in a frequency domain, corresponding to a lower frequency and an upper frequency. For example, a frequency band of 2.4 megahertz (MHz) may include frequencies between approximately 2,400 and 2,483.5 MHz.

In some embodiments, the protocol metadata instance 300A may indicate one or more coexistence bands (e.g., B40, B41, B7, etc.). In some embodiments, a coexistence band may identify a frequency range that is shared by the communication device that performs the activity corresponding to protocol metadata instance 300A and at least one other communication device of the system. For example, protocol metadata instance 300A may indicate that the communication device that transmits a BT voice activity (e.g., the BT device 202A of FIG. 2) must coexist with at least one other communication device on each of the frequency bands B40, B41, and B7.

In some embodiments, the protocol metadata instance 300A includes one or more reactive policies. A "reactive policy" may identify one or more actions/operations to be performed in response to receiving a request corresponding to the activity ID. The reactive policies of protocol metadata instance 300A may indicate that the actions/operations performed by the receiving device (e.g., the cellular device 202D of FIG. 2) may include capping output power to 10 dBm and applying a threshold which indicates that a request corresponding to the activity ID is to be honored so long as a performance indicator (e.g., cellular quality indicator (CQI)) that indicates that the quality of cellular activity exceeds a threshold value (indicated with the value "X"). The protocol metadata instance 300A may indicate that this policy may be executed in response to receiving, from a given device, a first request including the activity ID.

In some embodiments, the protocol metadata instance 300A includes one or more thresholds. In some embodiments, at least one such threshold specifies an acceptable degree of throughput degradation (e.g., the throughput degradation corresponding to a device that is modifying its performance in response to the activities of another device).

The reactive policies of protocol metadata instance 300A may indicate that the actions/operations performed by the receiving device (e.g., the cellular device 202D of FIG. 2) may include shutting down a transmission device (e.g., a radio transmitter of the cellular device 202D) unless a performance indicator (e.g., the CQI) indicates that the quality of cellular activity exceeds a threshold value (indicated with the value "Y"). The protocol metadata instance 300A may indicate that this policy may be executed in response to receiving, from a given device, a second request including the activity ID. Executing this policy may cause the cellular device 202D to shut down its transmitter so long as cellular quality would not be degraded over some predefined amount.

The reactive policies of protocol metadata instance 300A may indicate that the actions/operations performed by the receiving device (e.g., the cellular device 202D of FIG. 2) may include shutting down a transmission device (e.g., a radio transmitter of the cellular device 202D) without regard to quality or any other factor. The protocol metadata instance 300A may indicate that this policy may be executed in response to receiving, from a given device, a third request including the activity ID. Executing this policy may cause the cellular device 202D to shut down its transmitter.

In some embodiments, the protocol metadata instance 300A may include an indicator that indicates whether a License Assisted Access secondary cell (LAA S-cell) is to be deactivated. In some embodiments, LAA is a feature of the cellular device 202D that leverages an unlicensed frequency band (e.g., 5 GHz) in combination with a licensed frequency spectrum to deliver a performance boost for mobile device users. In some embodiments, the indicator may indicate whether or not the LAA S-cell of the cellular device 202D is to be deactivated.

In some embodiments, the protocol metadata instances 300 (or any suitable protocol metadata instance of the data stores 304 and/or 210 of FIG. 2) may include any suitable data that describes any suitable aspect of a communication protocol corresponding to a particular activity.

Returning to FIG. 2, memory 212 may be configured to store the protocol metadata instances of data store 304 of FIG. 3 as received from coexistence manager 208. The coexistence manager 208 may be a component of an operating system of the device (e.g., user device 102) on which the devices of FIG. 2 operate. In some embodiments, the coexistence manager 208 may be configured to obtain and provide to each communication device a set of protocol metadata instances corresponding to the other communication devices 202. Each of the communication devices 202 may be configured with one or more memories at which the protocol metadata provided by the coexistence manager 208 may be stored. In some embodiments, separate coexistence engines executing at each of these communication devices may utilize this data to drive its operations as described herein with respect to the coexistence engine 206. In some embodiments, a coexistence engine may be shared by two or more communication devices (e.g., communication devices 202A-202C). This coexistence engine may execute from any one of those devices (e.g., WiFi device 202B) and may be configured to manage various operations performed by the communication devices 202A-202C in response to requests received from the cellular device 202D.

Figure 4:
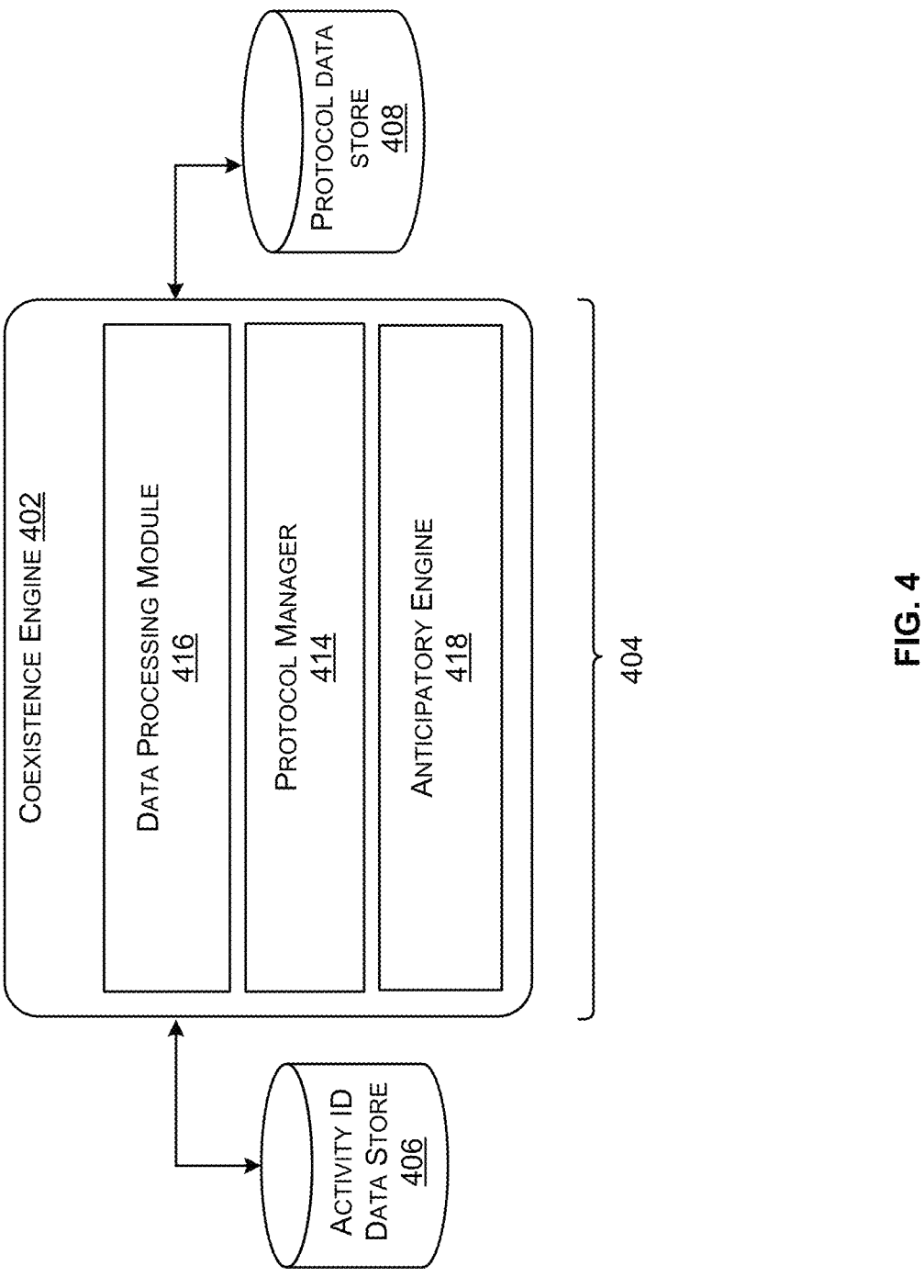
FIG. 4 is a schematic diagram of an example computer architecture for the coexistence engine, including a plurality of modules that may perform functions in accordance with at least one embodiment.

FIG. 4 is a schematic diagram of an example computer architecture 400 for the coexistence engine 402, including a plurality of modules (e.g., modules 404) that may perform functions in accordance with at least one embodiment. The coexistence engine 402 is an example of the coexistence engine (206 and/or the coexistence engine 108 of FIG. 1). The modules 404 may be software modules, hardware modules, or a combination thereof. If the modules 404 are software modules, the modules 404 can be embodied on a non-transitory computer-readable medium and processed by a processor in any of the computer systems described herein. Any suitable combination of the modules 404 may operate at a user device (e.g., user device 102 of FIG. 1). It should be noted that any module or data store described herein, may be, in some embodiments, a service responsible for providing functionality corresponding to the module 404 described below. The modules 404 may exist as part of the coexistence engine 402, or the modules 404 may exist as separate modules or services external to the coexistence engine 402. In some embodiments, the coexistence engine 402 may interface with one or more baseband components (e.g., a baseband processor that enables digital data to be converted to radio frequency signals and vice versa). In some embodiments, the coexistence engine 402 may interface with a communication channel (e.g., the SPMI or another suitable bus) to receive and/or transmit requests from/to other wireless technologies (e.g., other chips operating at the user device 102).

In the embodiment shown in the FIG. 4, data stores such as activity ID data store 406 and protocol data store 408 are shown, although data can be maintained, derived, or otherwise accessed from various data stores, either remote or local to the coexistence engine 402, to achieve the functions described herein. The coexistence engine 402, as shown in FIG. 4, includes various modules (e.g., subcomponents) such as a data processing module 416, protocol manager 414, and anticipatory engine 418, although functionality may be differently distributed between subcomponents of the coexistence engine 402. Some functions of the modules 404 are described below. However, for the benefit of the reader, a brief, non-limiting description of each of the modules is provided in the following paragraphs.

The data processing module 416 may be configured to receive and/or transmit any suitable data from/to any suitable computing device (e.g., from the coexistence manager 208 and/or any of the communication device 202 of FIG. 2). In some embodiments, the data processing module 416 may be configured to receive any suitable data from the coexistence manager 208 of FIG. 2. By way of example, the data processing module 416 may be configured to receive priority data (e.g., one or more mappings that identify priorities between activities, also referred to as "a priority mapping"). The data processing module 416 may be configured to store such priority data in activity ID data store 406, a data store configured to store such information. Likewise, the data processing module 416 may be configured to receive protocol metadata corresponding to any suitable number of communication devices. This information may be received from any suitable source (e.g., the coexistence manager 208) and stored at any suitable location (e.g., the protocol data store 408, a data store configured to store such information). In some embodiments, the priority data and/or the protocol metadata received may be stored in the respective data stores as being associated with a corresponding activity identifier such that an activity identifier can be utilized to retrieve a corresponding instance of protocol metadata and/or priority data.

In some embodiments, the data processing module 416 may be configured to receive a request that includes an activity identifier (referred to herein as "an activity ID"). The data processing module 416 may be configured to identify the activity identifier from the request received and utilize the activity identifier to retrieve any suitable combination of priority data and/or protocol metadata corresponding to the activity ID. In some embodiments, the priority data need not be associated with a particular activity ID. In these scenarios, the priority data may be globally applicable (e.g., providing priority rules for a number of activities corresponding to a number of communication protocols). The data processing module 416 may be configured to provide any suitable combination of the request, the priority data, and/or the protocol metadata to the protocol manager 414.

The coexistence engine 402 may include protocol manager 414. Protocol manager 414 may be configured to receive and/or obtain priority data and/or the protocol metadata from the data processing module 416 and/or the data stores 406 and/or 408. Protocol manager 414 may be configured with instructions that, when executed, cause the request received to be evaluated based at least in part on the protocol metadata. By way of example, the protocol manager 414 may determine, based on one or more reactive policies of the protocol metadata, that particular operations are to be performed in response to the request. In some embodiments, the protocol manager 414 may be configured to identify and execute the particular operations identified within the protocol metadata corresponding to the request. In some embodiments, the protocol manager 414 may be configured to identify which operations are to be performed in response to the request based at least in part on the priority data received from the data processing module 416. That is, the protocol manager 414 may utilize the priority data to identify whether the actions corresponding to this request or a previously received request are to be executed. In some embodiments, the protocol manager 414 may execute instructions that cause a previous action (e.g., turning off a transmitter executed due to a previous request) to be nullified or reversed based at least in part on identifying, from the priority data, that a different set of actions (e.g., applying a threshold) corresponding to a most-recently received request is to be performed (e.g., when a priority of the activity corresponding to the most-recently received request exceeds that of the activity corresponding to the previously received request). In general, the protocol manager 414 may be configured to manage execution of any suitable operations corresponding to a request. These operations may include, but are not limited to, applying a threshold power setting (referred to as "power capping" or "capping output power") to transmission of a particular communication device (e.g., the cellular device 202D), turning off a radio transmitter, deactivating a component of a particular communication device (e.g., the LAA S-cell of cellular device 202D), dropping transmission of a message, adding/removing antennas participating in antenna selection logic (e.g., so that antennas with worse coexistence implications are removed from the selection logic), and the like.

In some embodiments, the protocol manager 414 may maintain any suitable record corresponding to any suitable number of requests that indicates a time at which the request was received, one or more actions performed in response to the request, one or more thresholds utilized to identify the actions (or operations) to be performed in response to the request, the time at which a corresponding message was transmitted by another communication device, or any suitable data associated with the request, actions/operations, or thresholds. This data may be stored at the activity ID data store 406 such that the protocol manager 414 can track actions/operations and message transmission performed by one or more communication devices.

In some embodiments, the anticipatory engine 418 may be configured to receive the protocol metadata corresponding to a given request from the data processing module 416 and/or the protocol manager 414. In some embodiments, the anticipatory engine 418 may obtain the protocol data from the protocol data store 408 directly. The anticipatory engine 418 may be configured with instructions that, when executed, cause one or more timers to be set based at least in part on the protocol metadata. As a non-limiting example, if the anticipatory engine 418 identifies that a particular request is likely to be received at a later time, the anticipatory engine 418 may be configured to set a timer that is to expire just before reception of the request (e.g., within a threshold time period of the time at which the request is expected). When the time expires, the anticipatory engine 418 (and/or the protocol manager 414) may be configured to perform any suitable operations based on the knowledge that a request is about to be received. Thus, operations between communication devices can be optimized based on anticipating future requests.

For example, the anticipatory engine 418 may identify, from the protocol metadata corresponding to an activity identifier, one or more subsequent operations corresponding to at least one of an action or threshold; set a timer associated with the one or more subsequent operations; and cause the communication device to perform the one or more subsequent operations based at least in part on expiration of the timer. As an example, the anticipatory engine 418 may set a timer that is set to elapse at a time corresponding to the beginning of an LTE slot which is closest to the start of an on-going BT activity. Upon expiration of the timer, output power may be reduced from that slot an onward until the known end time of the BT activity. Thus, there would be no need to turn off LTE transmissions with high output power abruptly when BT operation begins, but rather, LTE would have taken measures (e.g., reducing output power) in that slot in anticipation of the BT activity that is overlapping.

Figure 5:
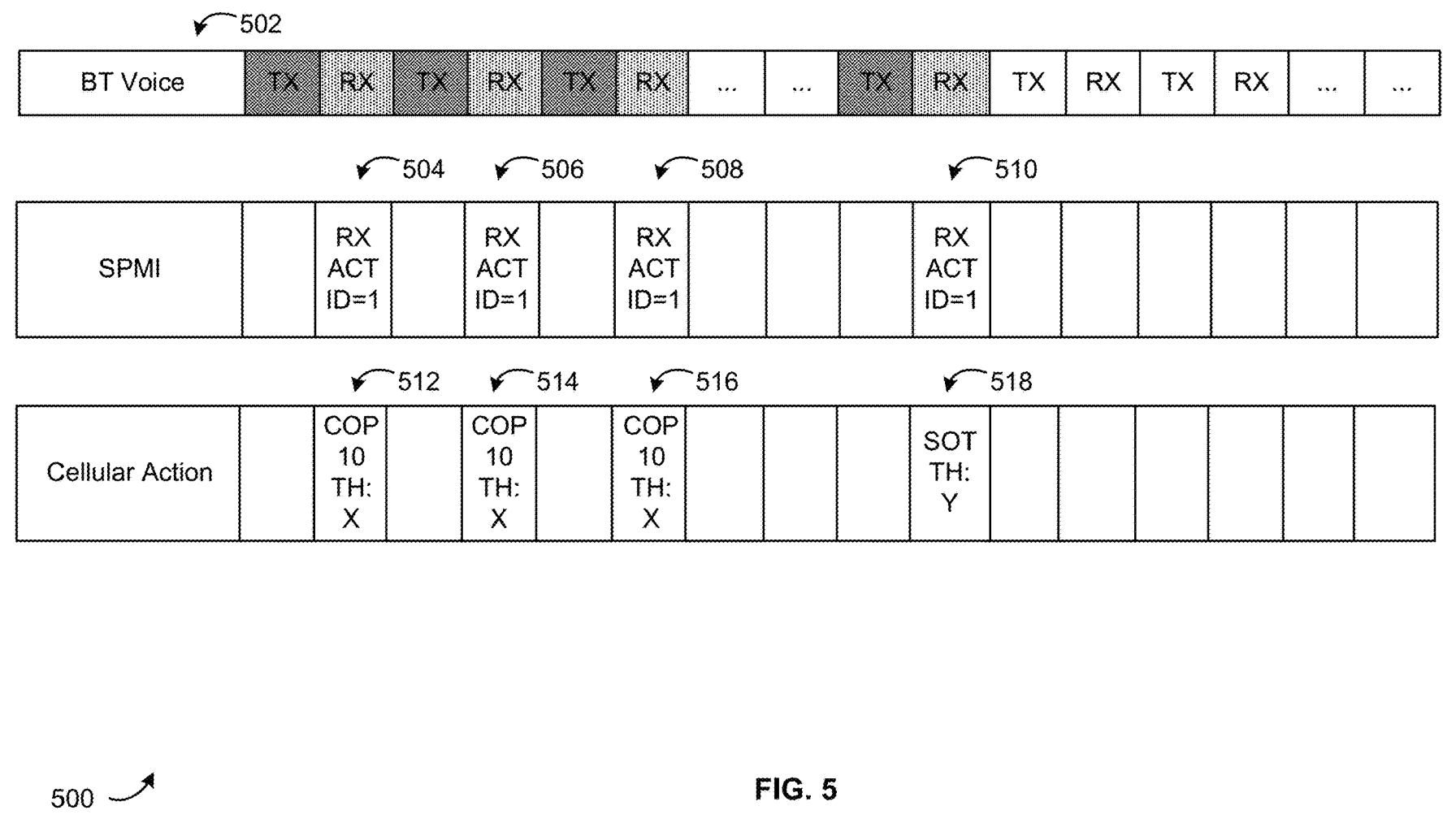

FIG. 5 illustrates an example use case 500 for managing coexistence between two or more wireless technologies, in accordance with at least one embodiment. FIG. 5 depicts a protocol corresponding to a particular activity ID (e.g., a protocol associated with a BT voice activity) at 502. By way of example, the protocol depicted at 502 indicates that, for a BT voice activity, a message is to be transmitted up to three times, 7.5 ms apart, and that two transmission retries may be attempted. The protocol depicted at 502 may correspond to the protocol metadata 300A of FIG. 3.

FIG. 5 further depicts data received by a coexistence engine (e.g., the coexistence engine 402 of FIG. 4) over an SPMI (e.g., SPMI 204 of FIG. 2). By way of example, a request with activity ID="1" may be received at each of the times indicated at 504, 506, 508, and 510. FIG. 5 further depicts a reactive policy that is applied based on a corresponding request. One or more actions and/or thresholds applied by the coexistence engine (a coexistence engine corresponding to the cellular device 202D of FIG. 2) are depicted at 512, 514, 516, and 518.

By way of example, a coexistence engine (e.g., the coexistence engine 402 of FIG. 4) executing at a cellular device (e.g., cellular device 202D of FIG. 2) may receive a request (referred to as "the first request") at 504 from another communication device (e.g., the BT device 202A of FIG. 2). In some embodiments, the request received includes an activity ID equal to the value "1." Using the activity ID, the coexistence engine may retrieve protocol metadata corresponding to the first request. For example, the coexistence engine may retrieve protocol metadata instance 300A of FIG. 3 based at least in part on using the activity ID to lookup the protocol metadata instance.

In some embodiments, the coexistence engine may be configured with instructions that, when executed, comprise identifying one or more reactive policies that identify one or more actions to perform and/or one or more thresholds to apply based at least in part on a set of conditions. As a non-limiting example, a first reactive policy may indicate that, upon receiving a request corresponding to a first transmission attempt, the coexistence engine may cap the output power of the cellular device to a particular amount (e.g., 10 dBm) so long as the quality of the cellular communications would not degrade over some threshold degree (as identified based at least in part on a threshold provided in the protocol metadata corresponding to the activity ID). Thus, in response to receiving the first request, in some embodiments the coexistence engine executes operations corresponding to the first reactive policy as depicted at 512. In some embodiments, this may include performing any suitable number of action(s) and/or applying any suitable number of threshold(s).

The coexistence engine may store any suitable data indicating what and when particular operations were performed and/or what and when a particular transmission or reception occurred at a separate communication device. By way of example, the coexistence engine (e.g., the protocol manager 414 of FIG. 4) may store data indicating the output power of the cellular device's power was capped to a particular value at a particular time and/or that a particular threshold was utilized (e.g., threshold X) when determining whether to cap the power. In some embodiments, the coexistence engine may store the time at which the first request was received and/or a time at which a transmission or reception corresponding to the first request and another communication device was performed. In some embodiments, the coexistence engine (e.g., the anticipatory engine 418 of FIG. 4) may set one or more timers (e.g., a timer that indicates a time by which a next message is expected and/or a time period that, when expired, indicates message transmission and/or reception by the other communication device is complete).

At 514, the coexistence engine may receive a second request. Once again the coexistence engine may obtain the protocol metadata associated with activity ID. Based on the protocol metadata data and the previously stored data associated with the first request, the coexistence engine may identify that the second request is a retransmission attempt. The coexistence engine may determine that the same operations are to be performed in response to the second request. The coexistence engine may perform those operations (e.g., capping the output power of the cellular device in accordance with the threshold X) and may update data indicating the output power of the cellular device's power was capped to a particular value at a particular time and/or that a particular threshold was utilized (e.g., threshold X) when determining whether to cap the power. In some embodiments, the coexistence engine may store the time at which the second request was received and/or a time at which a transmission or reception corresponding to the second request and another communication device was performed. The same operations described in connection with 514 may be performed again at 516 upon receiving a third request with the same activity ID.

Subsequently, the coexistence engine may receive another request (e.g., a fourth request corresponding to the activity ID, and received after the first, second, and third requests). The coexistence engine may once again identify the one or more reactive policies corresponding to the activity ID. This time, the coexistence engine may identify a second reactive policy that indicates that, upon receiving a request corresponding to a second transmission attempt (e.g., the fourth request), the coexistence engine is to shut down a transmission component (e.g., a radio transmitter of the cellular device) so long as the quality of the cellular communications would not degrade over some threshold degree (threshold Y, as identified based at least in part on a threshold provided in the protocol metadata corresponding to the activity ID). Thus, in response to receiving the second request, in use case 500, the coexistence engine executes operations corresponding to the second reactive policy as depicted at 518.

In some embodiments, the coexistence engine (e.g., the protocol manager 414) may identify that message transmission and/or reception is complete and may delete any previously stored data used for tracking purposes. For example, if no other requests corresponding to the activity ID are received (e.g., based on a timer set by the protocol manager 414 and in accordance with the protocol metadata), the coexistence engine may delete the previously stored data used for tracking transmission and/or reception at the other communication device.

Figure 6:
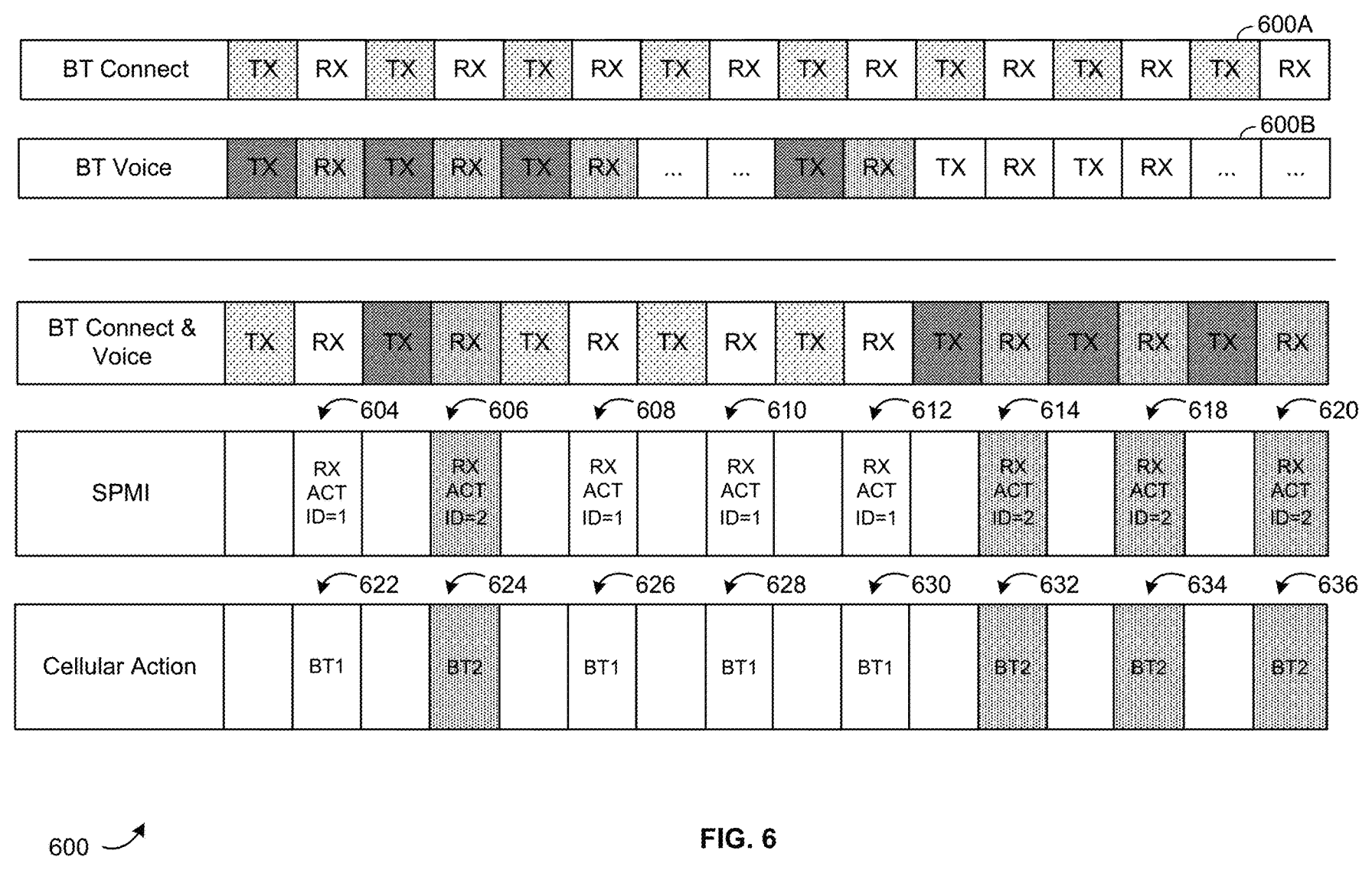

FIG. 6 illustrates another example use case 600 for managing coexistence between two or more wireless technologies (e.g., between the BT device 202A and the cellular device 202D of FIG. 2), in accordance with at least one embodiment. In some embodiments, a communication device (e.g., the BT device 202A) may implement one or more communication protocols. Two example communication protocols (communication protocol 600A corresponding to a BT connect activity, and communication protocol 600B corresponding to a BT voice activity) are depicted in FIG. 6.

FIG. 6 further depicts data received by a coexistence engine (e.g., the coexistence engine 402 of FIG. 4) over an SPMI (e.g., SPMI 204 of FIG. 2). By way of example, a request with activity ID="1" may be received at each of the times indicated at 604, 608, 610, and 612 while requests including activity ID "2" may be received at 606, 614, 618, and 620. Because the coexistence engine maintains protocol data corresponding to each activity ID, the coexistence engine can differentiate between requests and apply different thresholds and/or perform different actions/operations based on the request received. For example, actions and/or operations and/or thresholds corresponding to protocol metadata associated with a BT connect activity may be utilized by the coexistence engine at 622, 626, 628, and 630, while different protocol metadata associated with the BT voice activity may be utilized at 624, 632, 634, and 636.

Although the various requests illustrated in FIG. 6 originate from a single communication device (e.g., the BT device 202A), it should be appreciated that requests received over the SPMI may originate from any suitable number of communication devices (e.g., communication devices 202 of FIG. 2).

FIG. 7 is a flow diagram to illustrate an example method for managing coexistence between two or more wireless technologies, in accordance with at least one embodiment. Method 700 may be performed by a communication device (e.g., any of the communication devices 202 of FIG. 2) having at least one processor and at least one memory storing computer-readable instructions. Execution of the computer-readable instruction by the at least one processor may configure the computing device to execute the operations of method 700. It should be appreciated that the operations of method 700 may be performed in any suitable order. Additional operations may be included, or at least one of the operations of method 700 may be excluded in some embodiments.

The flow may begin at 702, where a communication device (e.g., the protocol manager 414 of FIG. 4) obtains protocol metadata corresponding to one or more communication protocols. In some embodiments, the communication device may be a cellular communication device operating adjacent to a WiFi communication device, both residing at a user device such as a smartphone. In some embodiments, the one or more communication protocols are individually associated with respective activity identifiers. By way of example, the protocol manager 414 may obtain an instance of protocol metadata that specifies various aspects of a communications protocol utilized by the WiFi communication device for a specific activity (e.g., WiFi Ranging, WiFi peer-to-peer activities, etc.). Some example instances of such protocol metadata are provided in FIG. 3 (e.g., such as protocol metadata instances 300C and 300D).

At 704, a request comprising an activity identifier of the respective activity identifiers may be received via a communication channel (e.g., the SPMI 204 of FIG. 2). The activity identifier may uniquely identify the activity to be performed by the requesting device (e.g., the WiFi communication device).

At 706, corresponding protocol metadata associated with the activity identifier received in the request may be obtained. By way of example, the activity identifier may be utilized by the protocol manager 414 to retrieve the protocol metadata store in the protocol data store 408 of FIG. 4.

At 708, one or more operations corresponding to at least one of: an action or a threshold are identified from the corresponding protocol metadata associated with the activity identifier. In some embodiments, the action or threshold depends on the activity identifier. By way of example, the threshold(s) (e.g., thresholds for output power and/or for antenna selection, etc.) corresponding to a BT connect activity versus the threshold(s) used for a BT voice activity may differ. This may be because one activity (e.g., the BT connect activity) may be less interfered by transmissions by other wireless technologies with higher output power than other activities (e.g., the BT voice activity).

At 710, the one or more operations may be performed by the communication device (e.g., the cellular device 202D) based at least in part on the identified action or the identified threshold.

The techniques described herein enable more optimal coordination between wireless communication devices than was previously provided. As a non-limiting example, a user may be having a video call on his cellphone using a Bluetooth headset that is wirelessly connected to the phone and operated in a 2.4 GHz frequency band. In this particular example, it can be assumed that Bluetooth receptions are impacted by cellular transmission, but that cellular receptions are not impacted by BT transmissions.

In previous systems, before any reception activity, the BT device (e.g., BT device 202A) sends an SPMI real-time request that requests that the cellular device (e.g., cellular device 202D) turn off its transmitter. The cellular device did not differentiate between requests; thus, the same threshold(s) (e.g., honor X % of all requests so long as overall cellular traffic is not degraded by more than 20%) would be applied by the cellular device for every request received.

In contrast, by utilizing the techniques disclosed herein, the BT device sends a request including an activity ID that indicates the activity is a BT voice activity (this would be the case for each receipt window during the voice session). The coexistence engine executing at the cellular device would utilize the protocol metadata associated with BT voice activities to identify that the BT voice activity has a particular periodicity and that retries are exceedingly important after the base attempt. Thus, the coexistence engine executing at the cellular device 202D may anticipate the appearance of the retransmission of the base attempt (according to a 7.5 ms cadence specified in the corresponding protocol metadata) and reduce output power on any packet transmission that overlaps it and/or react in case of retry indications from the BT device 202A and turn off the cellular transmitter if needed. The coexistence engine may utilize the protocol metadata to ensure that, with each attempt, the likelihood a response is received for the BT activity is increased. For example, for a first retry, the coexistence engine may turn off the transmitter of the cellular device only if it would not degrade cellular quality over some predefined threshold. For a second retry, the coexistence engine could turn off the transmitter despite any quality considerations to ensure that BT voice data can be received.

As another non-limiting example, a cellular device (e.g., a cellular device utilizing a License Assisted Access (LAA) and/or new radio unlicensed (NR-u) protocol). Both the cellular device (e.g., cellular device 202D) and a WiFi device (e.g., WiFi device 202B of FIG. 2) may provide network connection (e.g., to the Internet). Both may be running on the same frequency band.

In legacy systems, the WiFi device sends real-time indicators when it transmits, the cellular device counts those transmission indicators and, if the number is above a predefined threshold, it executes operations to turn off its LAA/NR-u secondary cell. The cellular device would then monitor those counts and, if the number is lower than a threshold, it could execute operations to turn its LAA/NR-u secondary cell back on.

Using the techniques disclosed herein, the cellular coexistence engine (e.g., the coexistence engine 402 operating at the cellular device 202D) monitors the activities being run by the communication devices 202 (e.g., the BT device 202A, the WiFi device 202B, and the UWB device 202C). The cellular coexistence engine may consider the amount and type of activities, jointly with the transmission indicators, to decide whether to turn the LAA/NR-u secondary cell on or off. For example, a computing intensive but relatively brief activity (e.g., UWB ranging) would not cause the LAA/NR-u secondary cell to be turned off.

Figure 8:
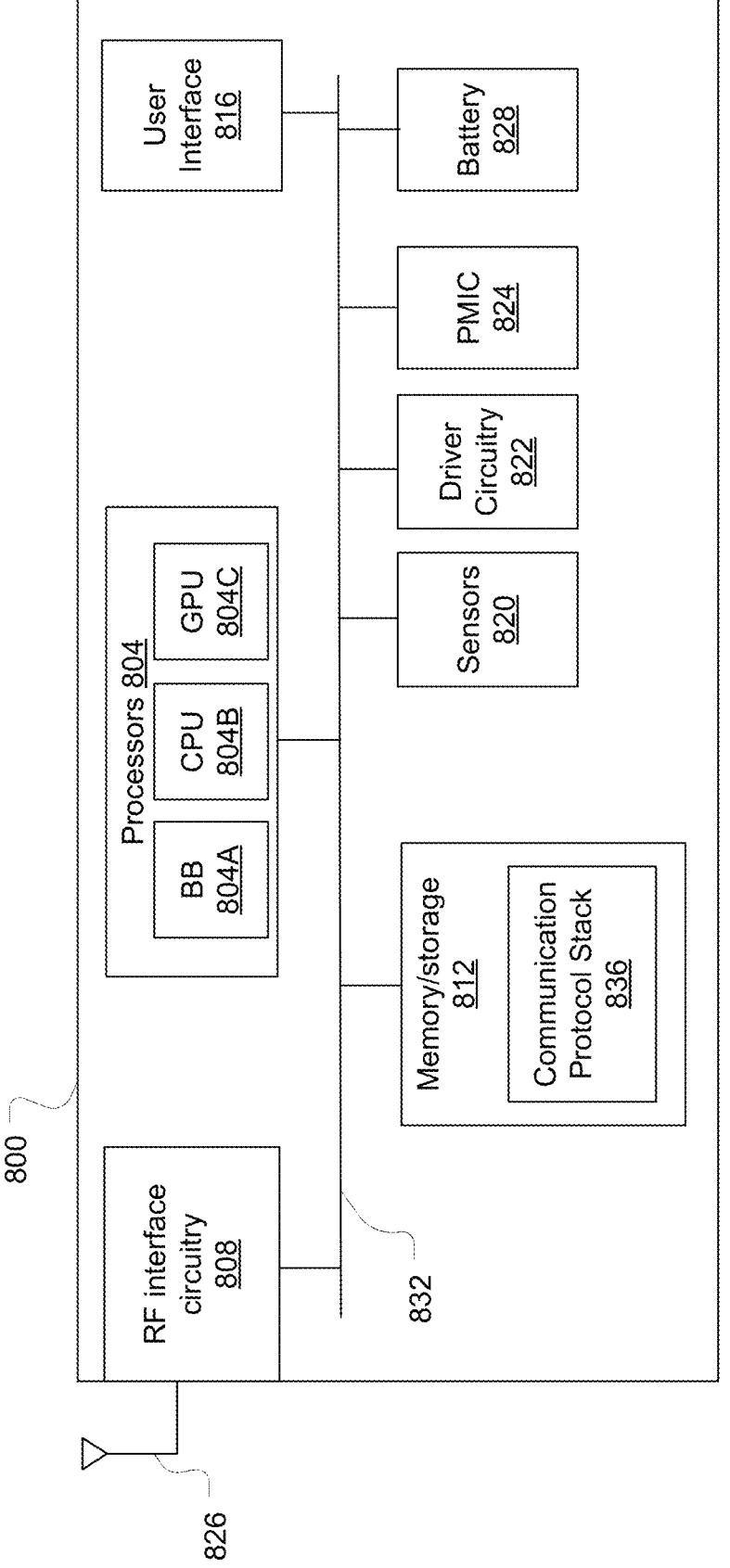
FIG. 8 comprises a functional block diagram of an example user device, according to an embodiment.

FIG. 8 illustrates an exemplary user device 800, in accordance with some embodiments. The user device 800 may be similar to and substantially interchangeable with user device 102 of FIG. 1.

The user device 800 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices.

The user device 800 may include processors 804, RF interface circuitry 808, memory/storage 812, user interface circuitry 816, sensors 820, driver circuitry 822, power management integrated circuit (PMIC) 824, and battery 828. The components of the user device 800 may be implemented as integrated circuits (ICs), portions thereof, discrete electronic devices, or other modules, logic, hardware, software, firmware, or a combination thereof. The block diagram of FIG. 8 is intended to show a high-level view of some of the components of the user device 800. However, some of the components shown may be omitted, additional components may be present, and different arrangements of the components shown may occur in other implementations.

The components of the user device 800 may be coupled with various other components over one or more interconnects 832, which may represent any type of interface, input/output, bus (local, system, or expansion), transmission line, trace, optical connection, etc. that allows various circuit components (on common or different chips or chipsets) to interact with one another.

The processors 804 may include processor circuitry such as, for example, baseband processor circuitry (BB) 804A, central processor unit circuitry (CPU) 804B, and graphics processor unit circuitry (GPU) 804C. The processors 804 may include any type of circuitry or processor circuitry that executes or otherwise operates computer-executable instructions, such as program code, software modules, or functional processes from memory/storage 812 to cause the user device 800 to perform operations as described herein.

In some embodiments, the baseband processor circuitry 804A may access a communication protocol stack 836 in the memory/storage 812 to communicate over a 3GPP compatible network. In general, the baseband processor circuitry 804A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 808.

The baseband processor circuitry 804A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 804A may also access group information from memory/storage 812 to determine search space groups in which a number of repetitions of a PDCCH may be transmitted.

The memory/storage 812 may include any type of volatile or non-volatile memory that may be distributed throughout the user device 800. In some embodiments, some of the memory/storage 812 may be located on the processors 804 themselves, while other memory/storage 812 is external to the processors 804 but accessible thereto via a memory interface. The memory/storage 812 may include any suitable volatile or non-volatile memory such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

Although not depicted, memory/storage 812 may store instructions for an operating system executed by the user device 800. In some embodiments, the operating system may include a component (e.g., the coexistence manager 208 of FIG. 2) for managing and/or distributing protocol metadata to one or more communication devices of RF interface circuitry 808. RF interface circuitry 808 may include any suitable combination of the communication devices 202 of FIG. 2. In some embodiments, the memory/storage 812 may include data store 210 of FIG. 2.

The RF interface circuitry 808 may include transceiver circuitry and a radio frequency front module (RFEM) that allows the user device 800 to communicate with other devices over a radio access network. The RF interface circuitry 808 may include various elements arranged in transmit or receive paths. These elements may include, for example, switches, mixers, amplifiers, filters, synthesizer circuitry, control circuitry, etc. In some embodiments, the RF interface circuitry 808 may include the communication devices 202 (or any suitable component of environment 200 of FIG. 2). In some embodiments, interconnects 832 may include the SPMI 204 of FIG. 2 that enables various devices of RF interface circuitry 808 to communicate with one another. In various embodiments, the RF interface circuitry 808 may be configured to transmit/receive signals in a manner compatible with new radio (NR) access technologies.

In the receive path, the RFEM may receive a radiated signal from an air interface via an antenna 826 and proceed to filter and amplify (with a low-noise amplifier) the signal. The signal may be provided to a receiver of the transceiver that down-converts the RF signal into a baseband signal that is provided to the baseband processor of the processors 804.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 826.

The antenna 826 may include a number of antenna elements that each convert electrical signals into radio waves to travel through the air and to convert received radio waves into electrical signals. The antenna elements may be arranged into one or more antenna panels. The antenna 826 may have antenna panels that are omnidirectional, directional, or a combination thereof to enable beamforming and multiple-input, multiple-output communications. The antenna 826 may include microstrip antennas, printed antennas fabricated on the surface of one or more printed circuit boards, patch antennas, phased array antennas, etc. The antenna 826 may have one or more panels designed for one or more specific frequency bands.

The user interface circuitry 816 includes various input/output (I/O) devices designed to enable user interaction with the user device 800. The user interface circuitry 816 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the user device 800.

The sensors 820 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes;

or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 822 may include software and hardware elements that operate to control particular devices that are embedded in the user device 800, attached to the user device 900, or otherwise communicatively coupled with the user device 800. The driver circuitry 822 may include individual drivers allowing other components to interact with or control various input/output (I/O) devices that may be present within, or connected to, the user device 900. For example, driver circuitry 822 may include a display driver to control and allow access to a display device, a touchscreen driver to control and allow access to a touchscreen interface, sensor drivers to obtain sensor readings of sensors 820 as well as control and allow access to sensors 820, drivers to obtain actuator positions of electro-mechanic components or control and allow access to the electro-mechanic components, a camera driver to control and allow access to an embedded image capture device, and/or audio drivers to control and allow access to one or more audio devices.

The PMIC 824 may manage power provided to various components of the user device 900. In particular, with respect to the processors 804, the PMIC 824 may control power-source selection, voltage scaling, battery charging, or DC-to-DC conversion.

In some embodiments, the PMIC 824 may control, or otherwise be part of, various power saving mechanisms of the user device 800. For example, if the platform user device is in an RRC_Connected state, where it is still connected to the RAN node as it expects to receive traffic shortly, then it may enter a state known as Discontinuous Reception Mode (DRX) after a period of inactivity. During this state, the user device 800 may power down for brief intervals of time and thus save power. If there is no data traffic activity for an extended period of time, then the user device 800 may transition off to an RRC_Idle state, where it disconnects from the network and does not perform operations such as channel quality feedback, handover, etc. The user device 800 goes into a very low power state and it performs paging where, again, it periodically wakes up to listen to the network and then powers down again. The user device 800 may not receive data in this state; in order to receive data, it must transition back to an RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed that the delay is acceptable.

A battery 828 may power the user device 800, although in some examples the user device 800 may be mounted and/or deployed in a fixed location, and may have a power supply coupled to an electrical grid. The battery 828 may be a lithium ion battery, a metal-air battery, such as a zinc-air battery, an aluminum-air battery, a lithium-air battery, and the like. In some implementations, such as in vehicle-based applications, the battery 828 may be a typical lead-acid automotive battery.

Illustrative methods, computer-readable medium, and systems for providing various techniques for pairing proximate devices are described above. Some or all of these systems, media, and methods may, but need not, be implemented at least partially by architectures and flows such as those shown at least in FIGS. 1-8 above. It should be understood that any of the above techniques can be used within any type of application operating at a user device. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, accessory devices and/or host devices which can be used to operate any of a number of applications. Accessory devices and/or host devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art (except for transitory media like carrier waves or the like) such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, as noted above, computer-readable storage media does not include transitory media such as carrier waves or the like.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims), are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise be read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data (or some portion of their personal information data) during registration for services or anytime thereafter. In another example, users can select not to provide personal information data for the purposes of receiving proactive reminders and/or notifications. In yet another example, users can select to limit the length of time personal information data is maintained or entirely prohibit the user of proactive reminders and/or notifications. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, to the extent the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

Illustrative embodiments of this disclosure are described herein, including the best mode known to the inventors for carrying out the disclosure. Variations of those illustrative embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining, by a communication device, protocol metadata corresponding to one or more communication protocols, the one or more communication protocols being individually associated with respective activity identifiers;
receiving, via a communication channel, a request comprising an activity identifier of the respective activity identifiers;
obtaining, by the communication device, corresponding protocol metadata associated with the activity identifier received in the request; and
determining, by the communication device, to perform a requested action based at least in part on the corresponding protocol metadata comprising:
identifying, from the corresponding protocol metadata associated with the activity identifier, one or more operations corresponding to the requested action; and
performing, by the communication device, the one or more operations to execute the requested action.

2. The computer-implemented method of claim 1, wherein the communication channel comprises a high-speed, bi-directional serial bus.

3. The computer-implemented method of claim 1, further comprising:
receiving, via the communication channel, an additional request comprising a second activity identifier, the activity identifier being a first activity identifier, and the first activity identifier being different from the second activity identifier;
obtaining, by the communication device, additional protocol metadata corresponding to the second activity identifier received in the additional request; and
determining, from a priority mapping, a first priority associated with a first activity corresponding to the first activity identifier and a second priority associated with a second activity corresponding to the second activity identifier, wherein identifying the one or more operations is based at least in part on the protocol metadata, the additional protocol metadata, the first priority, and the second priority.

4. The computer-implemented method of claim 1, wherein the protocol metadata comprises at least one of: a periodicity value, a retry policy, one or more operation bands, one or more coexistence bands, or one or more reactive policies.

5. The computer-implemented method of claim 4, wherein a reactive policy of the one or more reactive policies defines one or more respective operations to perform in response to receiving a corresponding request that includes a specific activity identifier that corresponds to the protocol metadata.

6. The computer-implemented method of claim 1, wherein the request is received from a separate communication device, the communication device and the separate communication device being a part of a user device.

7. The computer-implemented method of claim 1, wherein the one or more operations further correspond to a threshold.

8. The computer-implemented method of claim 1, wherein the requested action is one of a plurality of actions corresponding to respective ones of the respective activity identifiers, and wherein the determination is made based at least in part on the received activity identifier.

9. A communication device, comprising:
one or more processors; and
a memory storing non-transitory, computer-executable instructions that, when executed by the one or more processors, cause the communication device to:
   obtain protocol metadata corresponding to one or more communication protocols, the one or more communication protocols being individually associated with respective activity identifiers;
   receive, via a communication channel connected to the communication device, a request comprising an activity identifier of the respective activity identifiers;
   obtain corresponding protocol metadata associated with the activity identifier received in the request; and
   determining to perform a requested action based at least in part on the corresponding protocol metadata comprising:
      identify, from the corresponding protocol metadata associated with the activity identifier, one or more operations corresponding to the requested action; and
      perform, by the communication device, the one or more operations to execute the requested action.

10. The communication device of claim 9, wherein the protocol metadata corresponding to the one or more communication protocols corresponds to one or more communication devices separate from the communication device.

11. The communication device of claim 9, wherein executing the computer-executable instructions further causes the communication device to:
   identify, from the protocol metadata corresponding to the activity identifier, one or more subsequent operations corresponding to at least one of: an additional action or a threshold;
   setting a timer associated with the one or more subsequent operations; and
   performing, by the communication device, the one or more subsequent operations based at least in part on expiration of the timer.

12. The communication device of claim 9, wherein the protocol metadata identifies the requested action corresponding to the activity identifier, and wherein the requested action comprises adjusting a power setting of the communication device.

13. The communication device of claim 9, wherein the protocol metadata identifies the requested action corresponding to the activity identifier, and wherein the requested action comprises triggering deactivation of a secondary cell configured to utilize an unlicensed spectrum for transmission.

14. A non-transitory computer-readable storage medium having stored thereon computer-executable instructions that, when executed by a processor of a communication device, cause the processor to perform operations comprising:
   obtaining protocol metadata corresponding to a plurality of communication protocols, the plurality of communication protocols being individually associated with respective activity identifiers;
   receiving, via a communication channel, a request comprising an activity identifier of the respective activity identifiers;
   obtaining corresponding protocol metadata associated with the activity identifier received in the request; and
   determining to perform a requested action based at least in part on the corresponding protocol metadata comprising:
      identifying, from the corresponding protocol metadata associated with the activity identifier, one or more operations corresponding to the requested action; and
      performing the one or more operations to execute the requested action.

15. The non-transitory computer-readable storage medium of claim 14, wherein the protocol metadata identifies a threshold value, and wherein the threshold value specifies an acceptable degree of throughput degradation.

16. The non-transitory computer-readable storage medium of claim 14, wherein the protocol metadata identifies a plurality of actions, each action of the plurality of actions corresponding to either a first transmission attempt or a subsequent transmission attempt.

17. The non-transitory computer-readable storage medium of claim 14, wherein the communication device is one component of a user device, and wherein executing the computer-executable instructions further causes the communication device to receive the protocol metadata from a second component of the user device.

18. The non-transitory computer-readable storage medium of claim 17, wherein the communication device is a first communication device in communication with a second communication device, wherein the first communication device stores the protocol metadata, the protocol metadata corresponding to the second communication device.

19. The non-transitory computer-readable storage medium of claim 18, wherein the second communication device stores additional protocol metadata corresponding to the first communication device.

20. The non-transitory computer-readable storage medium of claim 19, wherein the first communication device and the second communication device operate within a same frequency spectrum.

* * * * *